United States Patent
Dwarakanathan

(10) Patent No.: US 10,791,018 B1
(45) Date of Patent: Sep. 29, 2020

(54) FAULT TOLERANT STREAM PROCESSING

(71) Applicant: Amazon Technologies, Inc., Reno, NV (US)

(72) Inventor: Srinivasan Dwarakanathan, San Diego, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 51 days.

(21) Appl. No.: 15/785,081

(22) Filed: Oct. 16, 2017

(51) Int. Cl.
 *H04L 12/24* (2006.01)
 *H04L 29/08* (2006.01)
 *H04L 12/703* (2013.01)

(52) U.S. Cl.
 CPC ...... *H04L 41/0654* (2013.01); *H04L 67/2842* (2013.01); *H04L 45/28* (2013.01)

(58) Field of Classification Search
 CPC ..... H04L 41/0654; H04L 45/22; H04L 45/28; H04L 67/2842
 See application file for complete search history.

(56) References Cited

U.S. PATENT DOCUMENTS

| | | | | |
|---|---|---|---|---|
| 8,089,987 B2 * | 1/2012 | Spicer | ............... | G06F 11/2097 370/469 |
| 2007/0028144 A1 * | 2/2007 | Graham | ............... | G06F 11/2023 714/34 |
| 2010/0014418 A1 * | 1/2010 | Yonezawa | ........... | G06F 11/2028 370/225 |
| 2010/0235681 A1 * | 9/2010 | Suetsugu | ........... | G06F 11/1471 714/15 |
| 2012/0166886 A1 * | 6/2012 | Shankar | ............. | G06F 11/2028 714/43 |
| 2018/0139086 A1 * | 5/2018 | Chakraborty | ....... | H04L 41/0654 |
| 2018/0139118 A1 * | 5/2018 | Johnson | ............... | H04L 43/106 |
| 2018/0152363 A1 * | 5/2018 | Tsirkin | ............... | H04L 41/0654 |

* cited by examiner

*Primary Examiner* — Min Jung
(74) *Attorney, Agent, or Firm* — Hogan Lovells US LLP

(57) ABSTRACT

A buffer box can be configured for an edge switch that is connected to one or more downstream nodes of a stateful stream processing system. Various upstream nodes can transmit data to downstream nodes for processing. At various locations in the data streams, the upstream nodes can include markers to indicate when a checkpoint should be generated or updated for the state of the data. Between markers, the data can be copied to a respective buffer box for the downstream node and edge switch. In the event the downstream node fails, the downstream node can obtain the checkpoint data to update state, and can receive the recent data from the local buffer box, rather than the corresponding upstream nodes. This can improve bandwidth usage and recovery time versus conventional recovery approaches, and can minimize impact of the recovery on other nodes across the network.

20 Claims, 6 Drawing Sheets

FAULT TOLERANT STREAM PROCESSING

BACKGROUND

An ever-increasing amount of data is being stored electronically, in locations such as data center networks. In large data centers, communications between data servers may have to undergo a significant number of hops between components, such as network switches, based at least in part upon the network topology. Data can be communicated between upstream servers, or nodes, and downstream servers across the data center network. Since the servers can be positioned at a wide variety of locations across the network, and because the communication path between them can be long, it can take an appreciable amount of time and bandwidth to recover from the failure of a server. For example, failure of a downstream server may require one or more upstream servers to retransmit large amounts of data to a new downstream server, from various locations spread across the network, in order to recover from the failure and enable the new downstream server to obtain the prior state of the failed downstream server.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to recovering from a node failure in a data processing system. In particular, various embodiments take advantage of a buffer box in communication with an edge switch, where that edge switch is connected to a downstream node of a stateful stream processing system. Various upstream nodes can transmit data to one or more downstream nodes for processing. At various locations in the data streams, the upstream nodes can include markers to indicate when a checkpoint should be generated or updated for the state of the data. Between markers, the data can be copied to a respective buffer box for the downstream node and edge switch. In the event the downstream node fails, a new downstream node can access the checkpoint data to update state, and can receive the recent data from the local buffer box, rather than the corresponding upstream nodes, which can improve bandwidth usage and recovery time, as well as reducing the impact of the recovery on other nodes across the network.

Various other functions can be implemented within the various embodiments as well as discussed and suggested elsewhere herein.

Figure 1:
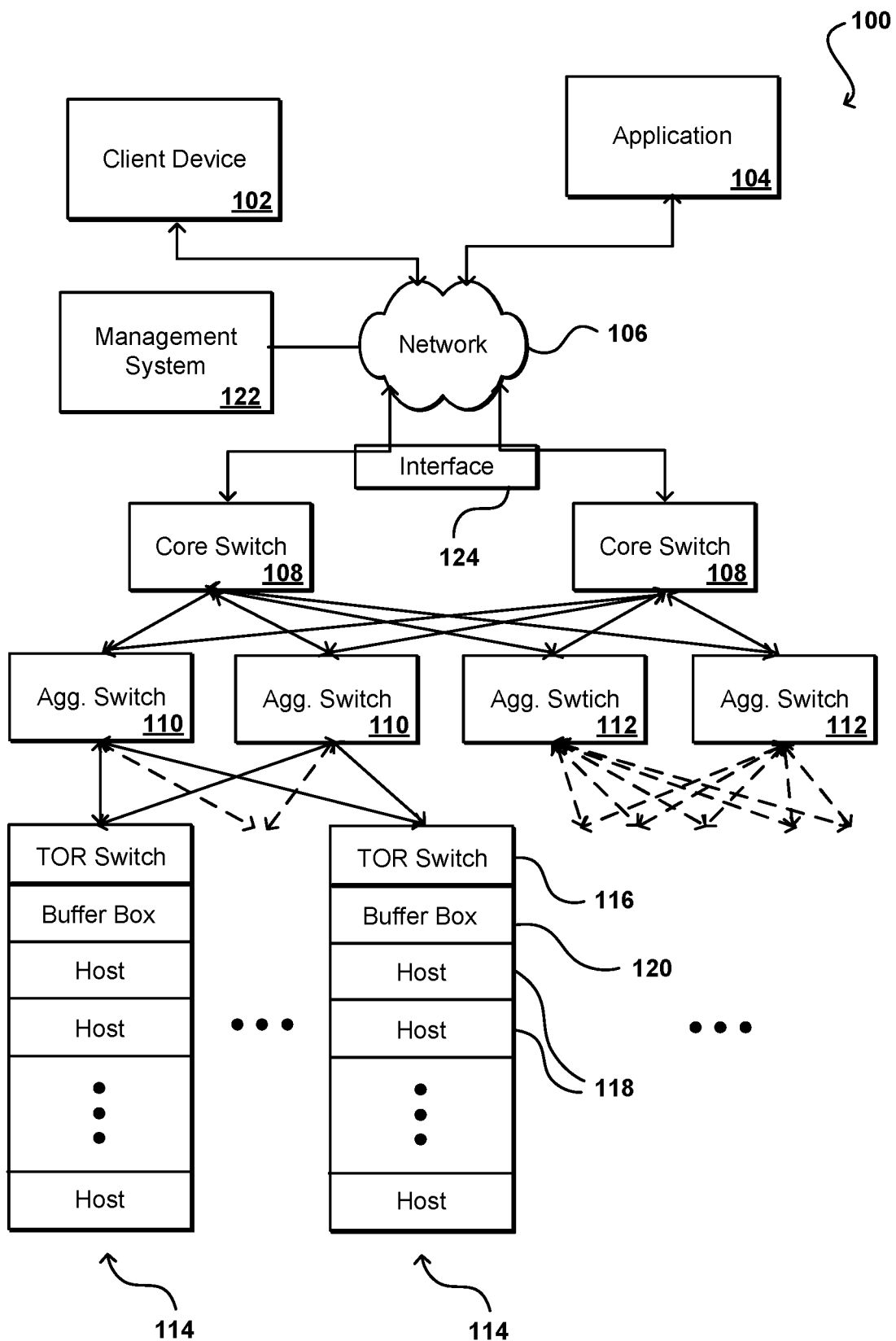
FIG. 1 illustrates an example of a network topology that can be utilized in accordance with various embodiments.

FIG. 1 illustrates an example network topology 100 that can be utilized in accordance with various embodiments. In this example, multiple host machines 118, such as application servers or data servers, are configured to host data and/or perform operations on behalf of one or more customers. These operations may include tasks such as serving content, executing large-scale computations, and the like. Some of these host machines 118 may be configured to offer the same or overlapping functionality, while other host machines might be configured to perform different or unique tasks. The host machines can be grouped together into clusters or other functional groups for the performance of specific tasks, such as may be provided as part of a data center, cloud computing offering, or processing service. The electronic environment in such cases might include additional components and/or other arrangements, such as those discussed elsewhere herein.

The topology illustrated in FIG. 1 represents a conventional hierarchical network design that can be used to route requests to specific host machines or other such devices, in order to provide users or applications with access to a variety of distributed resources. This example shows a typical design that can be used for a data center, for example, wherein a source such as an end user client device 102 or application 104 is able to send requests across at least one network 106, such as the Internet or a cellular network, to be received by one or more components of the data center. These components can include, for example, one or more interfaces or other components of an network interface layer 124, which can include components such as application programming interfaces (APIs), load balancers, and the like. Properties of various components of the network, such as provisioned virtual machines or machine instances, for example, can be managed using at least one management system, component, or service 122, which can be internal or external to the data center or other such offering. In this example, the requests are received over the network(s) 106 and directed to one of a plurality of core switches 108, but it should be understood that there can be any of a number of other components between the network(s) 106 and the core switches 108 as known in the art and discussed herein. As traditional differentiators have substantially disappeared, the terms "switch" and "router" are often used interchangeably. For purposes of clarity and explanation when this document refers to a "switch," it should be understood this term as used also encompasses routers and other devices or components used for such purposes. Further, the switches can include any appropriate switch, such as a multilayer switch that operates at different levels in an OSI (Open System Interconnection) reference model, among other such options.

As illustrated, each core switch 108 is able to communicate with each of a plurality of aggregation switches 110, 112, which in at least some embodiments are utilized in pairs. Utilizing aggregation switches in pairs provides a redundant capability in case one of the aggregation switches experiences a failure or is otherwise unavailable, such that the other aggregation switch can route traffic for the connected devices. Each pair of aggregation switches 110, 112 is linked to a plurality of physical racks 114, each of which typically contains a top of rack (TOR) or "access" switch 116 and a plurality of physical host machines 118, such as data servers and other processing devices. As shown, each aggregation switch can be connected to a number of different racks, each with a number of host machines or other such devices. The links between the layers can each comprise redundant links, or link pairs, with separate links for inbound and outbound traffic. If the network utilizes redundant 1 Gigabit Ethernet (GbE) links, for example, the total bandwidth per redundant link is 2 GbE.

As an additional benefit, the use of aggregation switch pairs enables the capability of a link to be exceeded during peak periods, for example, wherein both aggregation switches can concurrently handle and route traffic. Each pair of aggregation switches can service a dedicated number of racks, such as 120 racks, based on factors such as capacity, number of ports, etc. There can be any appropriate number of aggregation switches in a data center, such as six aggregation pairs. The traffic from the aggregation pairs can be aggregated by the core switches, which can pass the traffic "up and out" of the data center, such as back across the network 106. In some embodiments, the core switches are provided in pairs as well, for purposes including redundancy.

In some embodiments, such as high radix interconnection networks utilized for high-performance computing (HPC) or other such purposes, each physical rack can contain multiple switches. Instead of a single physical TOR switch connecting thirty-six hosts in a physical rack, for example, each of three switches in the rack can act as a local TOR switch for a "logical" or "virtual" rack (a sub-rack of a physical rack or logical grouping of devices (hosts and/or switches) from multiple racks), with each local TOR switch connecting twelve of the host machines. The logical racks can be implemented using physical or wireless switches in different embodiments. In some embodiments each of these switches within a high performance computing rack manages up to twelve servers, but the number can vary depending on factors such as the number of ports on each switch. For example, if a switch contains twenty-four ports, half of those ports typically will be host-facing and the other half will face the external network. A design in accordance with one embodiment could utilize seven racks with three switches in each, with each local TOR switch communicating (redundantly) with twelve servers, which would generally be equivalent to twenty-one separate racks each with a single TOR switch communicating with twelve servers, for example. In subsequent figures and description, it should be understood that physical or logical racks can be used within the scope of the various embodiments.

Various host machines, servers, or other such devices may be configured to perform aspects of a common calculation or operation for a customer, application, or other such source (herein also known as a "workload"), which can be distributed, dispersed, and/or clustered according to the topology and capacity of the interconnect fabric between the computing devices (herein known as the "network fabric"). The network fabric itself is typically organized as hierarchical layers, where each layer contains a multiplicity of switching devices which route communication traffic between the host devices or layers of other switching devices. The choice of workload placement on the computing devices, and therefore of the degree of dispersion of the workload relative to the span of the network fabric, may be chosen to depend upon factors such as the subscription rate between layers of a network, number or diversity of workloads already provisioned on available computing devices, transmission bandwidth or latency or reliability requirements of the workload, buffering capacity of networking or computing devices, and other such factors. Workload bandwidth and latency requirements may be inferred from general assumptions about customer usage behavior or by measurement of historical usage either specifically by customer or in aggregate, or otherwise intended use may be specified directly by the customer through programmatic calls to an Application Programmer Interface (API) or other such management interface or configuration solution.

Such dispersion of workloads across computing devices can enable the hosting of High Performance Computing (HPC) clusters that communicate using conventional network protocols, such as the Internet Protocol (IP), within a shared data center environment. The communication can occur over any network topology or interconnect devices, including traditional Hierarchical Aggregation Pair networks using large/expensive routers or high radix aggregation fabrics (also known as Fat Tree, Constant Bisectional Bandwidth and Clos networks) using high-throughput commodity switches (i.e., inexpensive switches with small buffers relative to aggregate bandwidth). This workload placement strategy across host devices can be provided and/or utilized in any appropriate electronic environment, such as a cloud computing offering, as well as non-virtualized or otherwise private data center hosts using equivalent networking. Various embodiments described herein are particularly applicable to protocols found in the Internet Protocol suite or other protocol stacks that do not rely heavily on host-side buffering, although other protocols find use with various other embodiments.

As mentioned, however, the need to transfer data between host machines, or nodes, within the network can result in some machines being treated as "upstream" nodes and other machines being treated as "downstream" nodes, where data for a given operation, or set of operations, will flow between the upstream and downstream nodes. It should be understood, however, that some nodes can serve as both upstream nodes and downstream nodes, depending upon the respective operation. When arranged according to a topology such as that illustrated in FIG. 1, the paths between the upstream nodes and the downstream nodes can be quite long, and can involve a number of different switches. In the event that a downstream node fails, the provisioning of a new downstream node can cause the necessary information to be rewritten from the upstream node(s) to the downstream node across the network fabric, which can take a significant amount of time and bandwidth. Accordingly, approaches in accordance with various embodiments introduce buffer boxes 120 into various server racks, or other locations, that can buffer at least some of the data necessary to recover from such a fault. Placing the buffer boxes 120 on the individual racks, or otherwise proximate the downstream nodes, can significant reduce the path for the data to travel for fault recovery, which can significantly reduce both time and bandwidth needed for the recovery. A buffer box can include any appropriate component or system able to at least temporarily store data, as may include memory, a persistent storage device, a data server, flash memory, a data partition, and the like.

In some embodiments, the transmission of data between an upstream node and a downstream node occurs as part of a stateful stream processing system. Such a system can leverage a technology such as Software Defined Networking (SDN), which not only separates a control plane from a data plane for the network, but also allows for a programmtical configuration of the network. SDN can provides support for quality of service (QoS) through QoS queues and can be configured through, for example, software such as Open-Flow from the Open Networking Foundation (ONF). SDN can provide QoS for streaming and cloud applications through, for example, queuing, meters, flow control, and bandwidth reservation options available in the SDN. SDN has many traffic engineering (TE) techniques that can be exploited to provide QoS. Multipath TCP (MPTCP)-aware SDN can also be used to improve throughput. To improve upon the performance and scalability of a centralized controller, multiple controllers can be used in various embodiments. Certain job schedulers consider only memory and CPU available on the nodes to schedule tasks. Network bandwidth available on the nodes is generally not considered by these systems in the scheduling decision. Some applications may have QoS requirements, as may relate to bandwidth and throughput. To schedule tasks of such applications, the network topology and bandwidth available between nodes should be considered by the scheduler in addition to CPU and memory available on nodes. Inter-task communication patterns and requirements, data locality and the network topology needs to considered while making scheduling decisions. The input rate also varies dynamically in some SPS applications. Thus, a job scheduler in SPS can use an SDN controller to schedule tasks based on criteria such as QoS requirements. The scheduler will not only consider the CPU and memory available on nodes but can also information fetched from the SDN controller to place the tasks. The network topology, available bandwidth on links can be used by the scheduler to decide about task placement. Once the job placement is decided, the scheduler communicates the decision with the SDN controller, which can use appropriate QoS and TE techniques to ensure the required QoS for the job.

Figure 2:
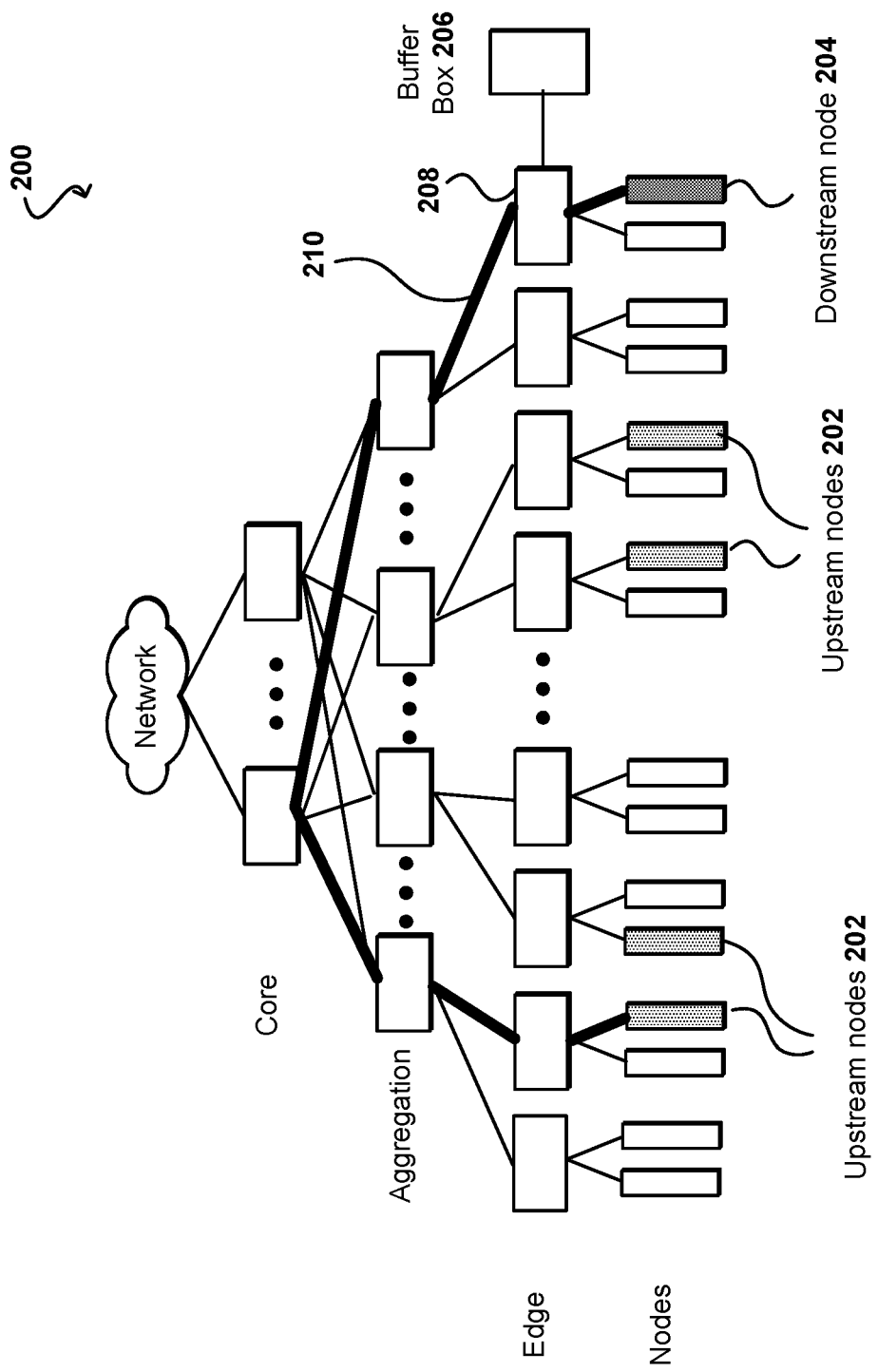
FIG. 2 illustrates communication paths useful for fault recovery that can be utilized in accordance with various embodiments.

As discussed, however, conventional approaches to node failover recovery can also negatively impact QoS and other requirements that rely upon factors such as bandwidth, throughput, and latency metrics. Accordingly, approaches in accordance with various embodiments attempt to expand upon the high availability approaches discussed above to make a stateful stream processing system essentially fault-tolerant, or at least robust to fault recovery. Upstream nodes in a conventional system buffer the data until the downstream nodes have check-pointed the state for fault-tolerance. A data marker is used in the data to indicate the time for the checkpoint. An upstream node 202, such as illustrated in the example network configuration 200 of FIG. 2, can buffer all the data from the previous marker to the next marker, and can discard the data once the checkpoint is processed or completed. If there is a failure in the corresponding downstream node 204, then the previous state can be recovered using the checkpoint. Data retained by the upstream node can be processed again by the new or now available downstream node 204. The downstream nodes can accept multiple upstream inputs for recovery. Further, the downstream node 204 is connected to the edge switch 208 and four other upstream nodes 202 which are placed in different blocks of the network. Thus, in the case of a failure there may need to be data resent, through the network 200, from the corresponding set of upstream nodes. Stream processing systems can have end hosts, such as the lowest level nodes in FIG. 2, connected through edge switches, aggregation switches, and core switches, among other such options. The upstream nodes 202 and downstream nodes 204 can be placed at any appropriate location along that lowest level. In the case a of failure of a downstream node 204, the buffered data from all the input nodes would have to be transferred over the network again, after the checkpoint data is restored on the allocated downstream node. The entire stream processing graph can be stopped, and the previously sent input sent again. This process increases the time for the recovery, and also increases the amount of network traffic. With a huge datacenter or other offering, these increases can be significant.

Accordingly, approaches in accordance with various embodiments can attempt to reduce the amount of network traffic needed during recovery of a downstream node, as well as the amount of time needed for recovery. In the example configuration 200 of FIG. 2, a buffer box 206 can be used to buffer the data local, or proximate, the corresponding downstream node 204. In some embodiments, an existing buffer on an edge switch, such as a TOR switch for a set of nodes in a rack, can be used to buffer all the input streams for a downstream node that is performing stream processing. The data for a downstream node 204 can be buffered until the next marker on the stream arrives. If the edge switch does not have sufficient buffer capacity to support such operations, a server can be connected directly to, or allocated for, the edge switch to act as a buffer box 206. A buffer box 206 can buffer the various input streams for a downstream stream processing node 204. A component such as a Software Defined Network (SDN) controller, discussed in more detail later herein, can program the corresponding switch to forward the packets, destined to the downstream node 204, to the buffer box 206. Upon failure of the downstream node, the buffered packets can then be sent directly from the edge node (in the buffer and/or buffer box 206) to the downstream node 204. In some implementations such a process can assume that the recovery operation is started in the same downstream node or in one of the nodes connected to the same edge switch. Such an approach can limit recovery traffic flow from the corresponding edge node 208 to the downstream node 204. Further, since the downstream nodes are directly connected to edge switches, the data transfer can be relatively fast. In other embodiments where a goal is to have high availability that spans a deployment, then the buffer box can be placed at the aggregation switch level instead of the edge switch level, among other such options. Unlike previous approaches, such an approach does not halt stream processing during node recovery, which makes the fault-tolerant process more efficient.

The set of thicker links 210 between an upstream node and the downstream node 204 illustrates the distance and number of components that would be involved in a conventional recovery of a failed node. The data to be sent over that link would include at least the data sent since the previous checkpoint. The new downstream node 204 would need to first obtain the data from the prior checkpoint, to arrive at the prior state, then cause the data that was not checkpointed to be sent again, here along the designated path. By instead buffering the data in the edge switch 208 and/or buffer box 206, the data since the checkpoint will have a significantly shorter path, and due to the direct connection the path can be significantly faster, resulting in much faster and resource conservative recovery. As mentioned, the edge switch 208 selected for the buffering can include the edge switch closest to the downstream node 204 in at least some embodiments. And, as mentioned, the buffer box 206 can buffer input from multiple upstream nodes 202, as well as for multiple downstream nodes 204 connected to the respective edge node 208. Further, since the other nodes across the network are not affected by the recovery process, the other nodes can continue to process data and instructions.

Figure 3:
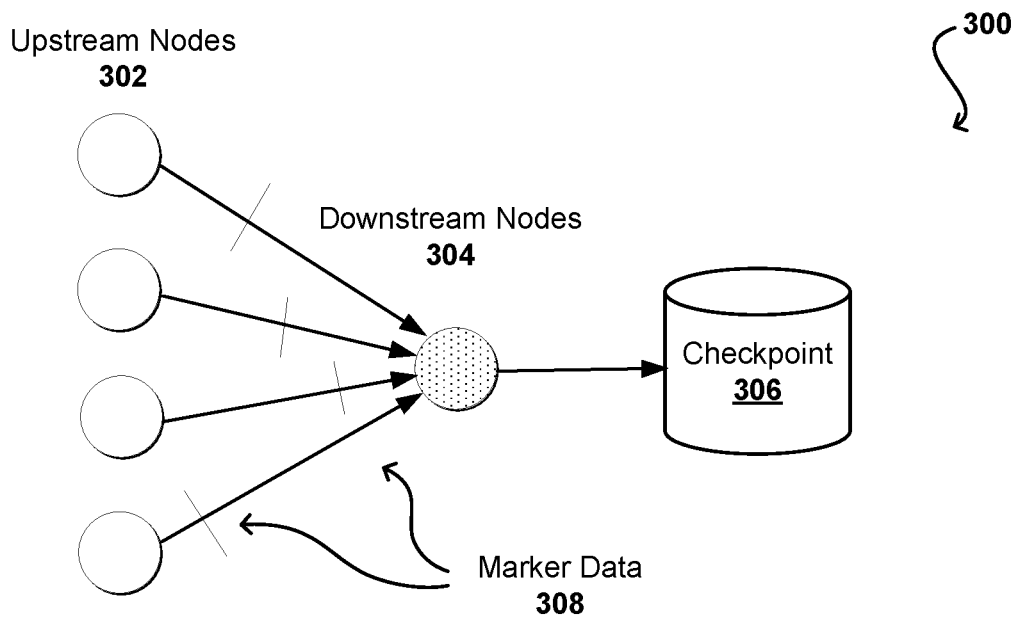
FIG. 3 illustrates an example approach to utilizing data markers that can be used in accordance with various embodiments.

In various embodiments, various upstream nodes 302 in stream processing can send some amount of data to one or more downstream nodes 304, which can perform some type of processing on the data. In some embodiments the downstream nodes can process data that is also, or alternatively, received from other sources as well. The processing can involve, for example, executing a simple or complex function on the data, such as to determine an average value over a specified period of time, recent trends in the data, and the like. The processing can utilize the previous state information to compute the next value, as per the stateful stream processing. As illustrated in the example situation 300 of FIG. 3, there can be a marker 308 for each stream of data transmitted between the upstream 302 and downstream 304 nodes. Each marker can give an indication of the location and/or time in the stream for which the data was should next be checkpointed, or was last checkpointed in some embodiments. The markers can be set for specific intervals or frequencies in some embodiments, such that a marker is placed on a stream for every one-hundred bytes of data or every 500 ms, among other such sequencing options. As illustrated, the downstream node 304 is receiving data from four upstream nodes 302, which each has sent a corresponding marker. Each marker can take one of various forms, such as may include a timestamp or other value indicating the location specified by the marker. For example, the marker can be a packet with header information identifying the packet as a marker, where the marker includes a timestamp and/or other indicator used to correlate the location of the marker with other packets in the stream. Once the downstream node 304 receives the marker from each of the upstream nodes 302, the downstream node can determine that the data is ready to be checkpointed. At that point, the data can be written to a checkpoint data store 306 or other such repository. Once written to the checkpoint data store, the buffered data for each stream received prior to the markers for the checkpoint can be discarded. The buffer can then start to buffer the data since the last marker on each stream, which should be the next to be checkpointed. The buffering will continue until a marker is again received on each stream, at which time the data will be checkpointed and the buffer flushed, as discussed previously. Thus, when a failure occurs and a new downstream node is to be generated, only the information since the last marker that is stored in the buffer needs to be resent to the downstream node, and in this case can be sent from the local edge switch or buffer box.

Figure 4:
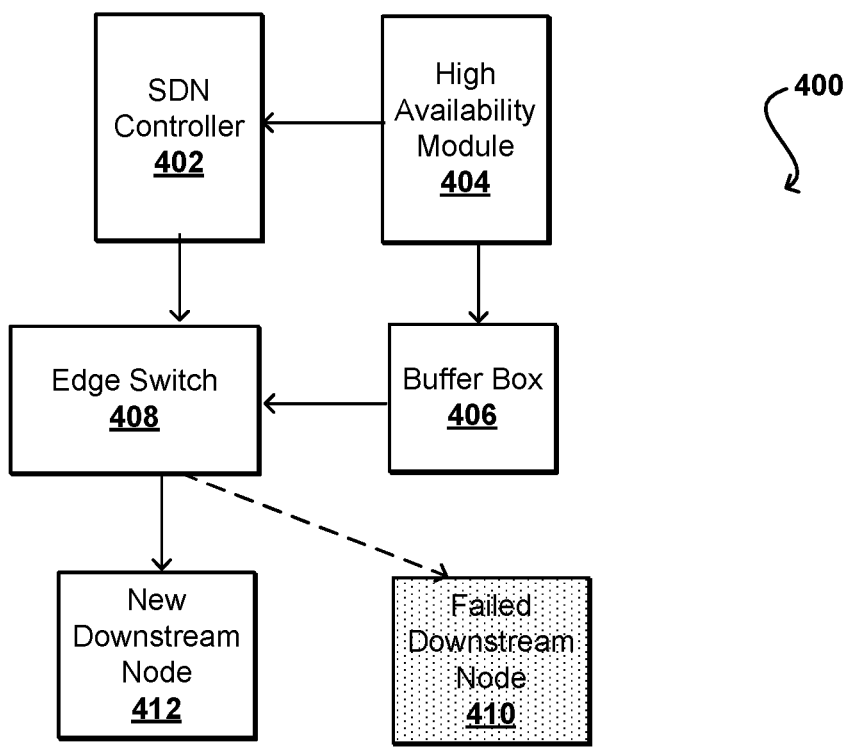
FIG. 4 illustrates an example set of components operable to manage fault recovery that can be utilized in accordance with various embodiments.

Further discussion of the operation of a system in accordance with various embodiments can refer to the configuration 400 illustrated in FIG. 4. In this example, a downstream node 410 is initially connected to a respective edge switch 408. The edge switch 408 is directly connected to the downstream node 410, as well as a respective buffer box 406. The data from the downstream node 410 is buffered by the edge switch 408 buffer and/or buffer box 406. Once it is determined that the current downstream node 410 has failed, a new downstream node can be allocated which can determine the checkpoint data, and then receive the data since the last checkpoint marker from the buffer box 406. The data can pass only through the edge switch to get to the new downstream node, as opposed to having to travel through the network from each respective upstream node. As mentioned, in this embodiment the new downstream node can be the same node or connected to the same edge switch such that the buffer box (or other appropriately configured data server useful for buffering) can directly transmit the data, although other configuration options can be utilized as well within the scope of various embodiments. The buffer box can include or reference a mapping indicating the nodes or streams for which data is to be buffered. Further, a single buffer box can buffer data for multiple upstream and/or downstream nodes. In at least some embodiments there can be a software agent executing on the buffer box that manages the mapping. For stream processing there can also be a graph, managed by a job orchestrator or other such system, that indicates the various upstream and downstream nodes, as well as the correlation between them. In some embodiments, however, there can be a buffer box on each rack or edge switch such that buffering can be done for any connected downstream node, or other such component.

The SDN controller 402 can receive information from the job orchestrator (not shown), which creates and manages the respective data stream and processing nodes. The job scheduler can be, for example, a scheduler for an Apache fleet that is responsible for tasks such as to create upstream and downstream services, and schedule tasks for those services to be performed by the respective nodes. The information can include information about the upstream and downstream nodes, as well as their correlation. The SDN controller can determine information such as the IP address and/or port used for the data stream. The SDN controller can also add one or more rules to enforce on the stream. For example, a rule can be added that any data sent between the addresses for the upstream and downstream nodes on the stream should also be sent to the corresponding address or port for the respective buffer box. As mentioned, the SDN controller can utilize a protocol such as OpenFlow to manage the respective stream information. In at least some embodiments the SDN controller can automatically add rules to the respective edge switches, whereby if a data packet is received from an upstream node with a specific IP address and port number, any packet reaching the edge switch should be sent to both the downstream node and the buffer box, with the respective IP addresses and ports. The SDN controller can manage other aspects of the stream as well, such as the amount of bandwidth on a given data link between the edge switch and buffer box.

The SDN controller 402 can also receive information from a high availability module 404 that is configured to perform tasks such as to manage node availability. In the event of a failure of a downstream node 410, for example, the high availability module 404 can detect the failure and select and/or manage the starting of the service on a new (or now available) downstream node 412. In some embodiments the downstream node 410 may send periodic heartbeat messages to the high availability module 404, and if a heartbeat message is not received within a determined period of time then the high availability module can determine that there is a problem with the node 410, and can attempt a failure recovery process. In some embodiments the module 404 might take another step first, such as to attempt to verify that the failed downstream node is being non-responsive or is otherwise less than fully operational or available. In response to determining a failure of the downstream node 410, the high availability module 404 can start the downstream service on a new downstream node 412, which may be selected from the servers or devices directly connected to the same edge switch 408. The module 404 can then inform the SDN controller 402 as to the new downstream node for the service. The SDN controller 402 can then update the node mapping such that packets from the upstream node(s) on the service now map to the new downstream node 412. A new rule can also be introduced that allows the data to go from the buffer box 406 to the new downstream node 412. The buffer box 406 can also update the mapping for the respective downstream node for which it is buffering data. The new downstream data can then obtain the checkpoint state and then receive the buffered data from the buffer box 406 that was received since the last checkpoint on the stream.

The high availability module 404 can detect failure of the downstream node 410 in a number of different ways. For example, the failure to receive a heartbeat message within a determined period of time can be indicative of a node failure. Similarly, the high availability module 404 and downstream node might share a particular storage file in a storage area network (SAN), where the node can periodically enter or update information, such as to include a most recent time stamp. The high availability module 404 can check periodically to determine whether an entry in the file has been detected within a determined or threshold amount of time. Failure to detect such an entry can be indicative of a failure. In some embodiments the high availability module 404 might also ping the node 410 to determine whether the node is down or whether there is an issue with the service, or another such issue.

Figure 5:
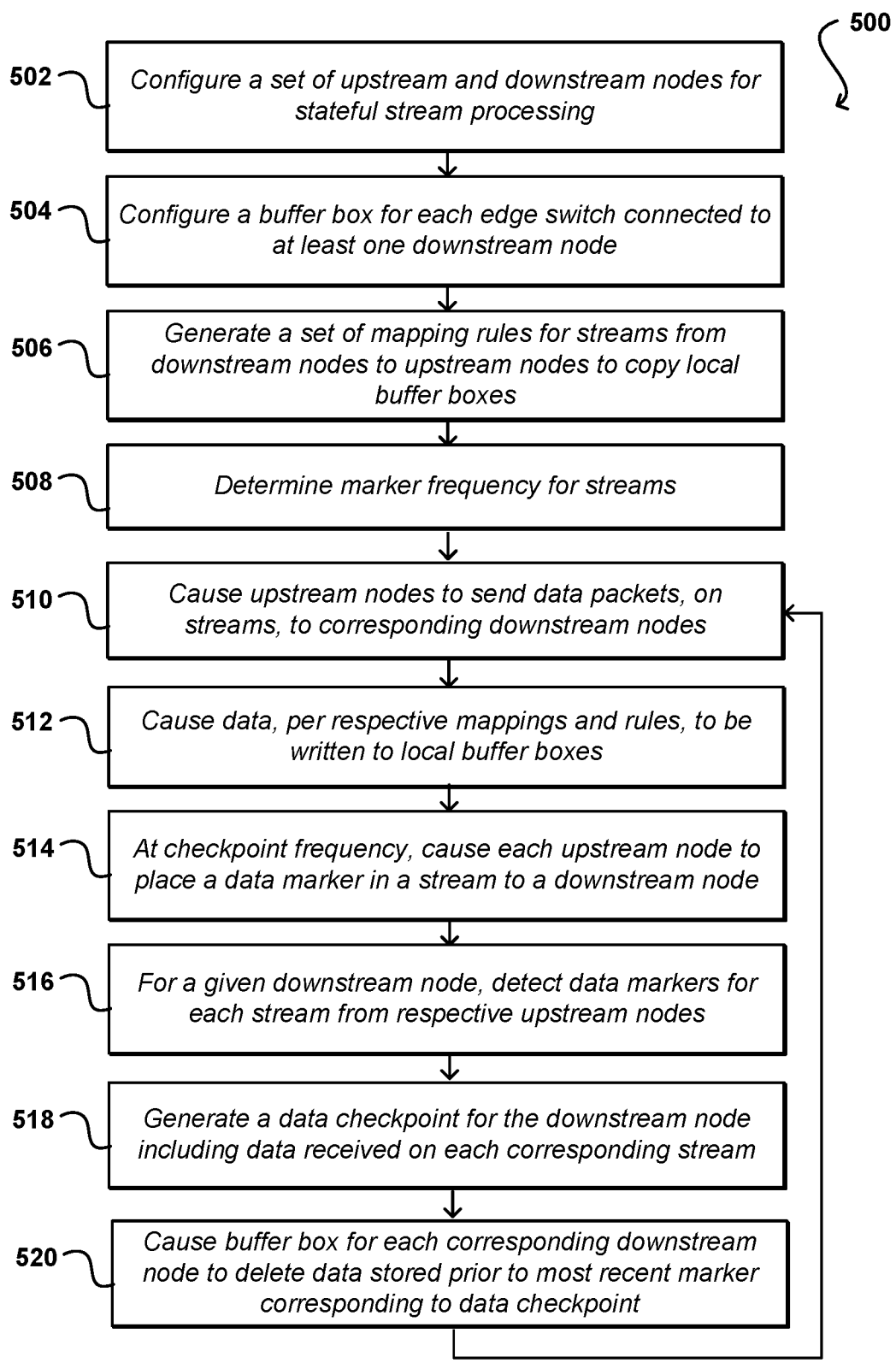
FIG. 5 illustrates an example process for locally buffering stateful stream processing data that can be utilized in accordance with various embodiments.

FIG. 5 illustrates an example process 500 for locally buffering stateful stream processing data that can be utilized in accordance with various embodiments. In this example, a set of upstream and downstream nodes is configured 502 for stateful stream processing. As mentioned, this can include configuring streams, such as by setting appropriate rules and mappings, to enable upstream nodes to send data for processing by one or more downstream nodes, among other such options discussed and suggested herein. As part of the configuration process, a buffer box can be configured 504 for each edge switch (e.g., top of rack switch) that is connected to at least one downstream node, as may take the form of a server in the corresponding rack. As mentioned, in some embodiments a buffer box may be configured for each rack in a data center or other such network or offering, while in others buffer boxes may be configured only for racks where there is insufficient buffer capacity in the edge switch itself, among other such options. In some embodiments, the buffer may be a partition or other portion or subset of storage available on the selected host machine. A set of mapping rules can be generated 506 for the streams to the downstream nodes on a rack from the corresponding upstream nodes, whereby packets sent on the streams will be copied to the corresponding buffer box. Various types of mapping rules can be generated and used by a component such as an SDN controller in accordance with various embodiments. As mentioned, in some embodiments the buffer box might buffer data for streams from multiple upstream nodes in a server rack, and each upstream node can potentially send data packets to multiple downstream nodes across the network. In addition to the mappings, the same or a separate component can determine 508 the marker frequency for the individual nodes or streams. As mentioned, any appropriate frequency or approach can be used to determine when to send markers for checkpointing data on a stream, as may relate to a specific time or data frequency. In some embodiments the frequency can be set such that the amount of checkpointing is not excessive or consuming too many resources, while also ensuring that there is not too much data to buffer between checkpoints that either risks a buffer overrun or would result in excessive data transmission for a recovery.

Once configured, the upstream nodes can be caused 510 to send data packets, on the relevant streams, to the corresponding downstream nodes. As part of the transmission process, the corresponding rules can be determined, such as may be based upon address and port or other such information, which can indicate the need to send a copy of the data to the local buffer box. As a result, the data on the stream can be caused 512 to be written to the buffer box on the local edge switch, or other such location indicated by the rule. As mentioned, in some embodiments the buffering might be done on the edge switch itself or on a buffer box connected to an aggregation switch, among other such options. In some embodiments, an SDN controller can add one or more forwarding rules in the edge switch to forward packets on the stream to the buffer box. During the transmission of data on the streams, each transmitting upstream node can be caused 514 to place a data marker in the respective streams to the downstream nodes at the checkpoint frequency or other determined times or intervals. As mentioned, the marker can take various forms, such as a timestamp, count, or identifier for a given node or stream. If a node sends data on multiple streams, then the marker can be placed or injected into each relevant stream. In some embodiments the marker frequency might be different for different streams, such as where the frequency may be data volume dependent. The downstream nodes receiving the data packets can detect 516 the data markers on each received stream, which as mentioned can come from one or more upstream nodes. In this example, a data checkpoint can be generated 518 once corresponding data markers are received for each incoming stream from the transmitting upstream nodes. In other embodiments, a checkpoint might be updated for each marker received, among other such options. The checkpointing in at least some embodiments can include writing a current state of the data for the downstream node to a checkpoint data store, or other such repository, that can be used to recover the current state of the downstream nodes, as well as to provide information about the processing of data from the various upstream nodes, etc. Once the markers have are received, the buffer boxes for the various nodes can be caused 520 to delete the data stored for a downstream node that was received prior to the recent data marker corresponding to the checkpoint. This can include the downstream node, checkpoint system, or stream manager sending a message to the various edge servers, upstream nodes, or buffer boxes to indicate that the checkpoint data was stored successfully, and that the buffered data prior to the checkpoint can be deleted. In other embodiments, the data might be deleted by each buffer box upon receiving or detecting the relevant data marker, among other such options. This process can continue as long as the stateful stream processing occurs across the network.

Figure 6:
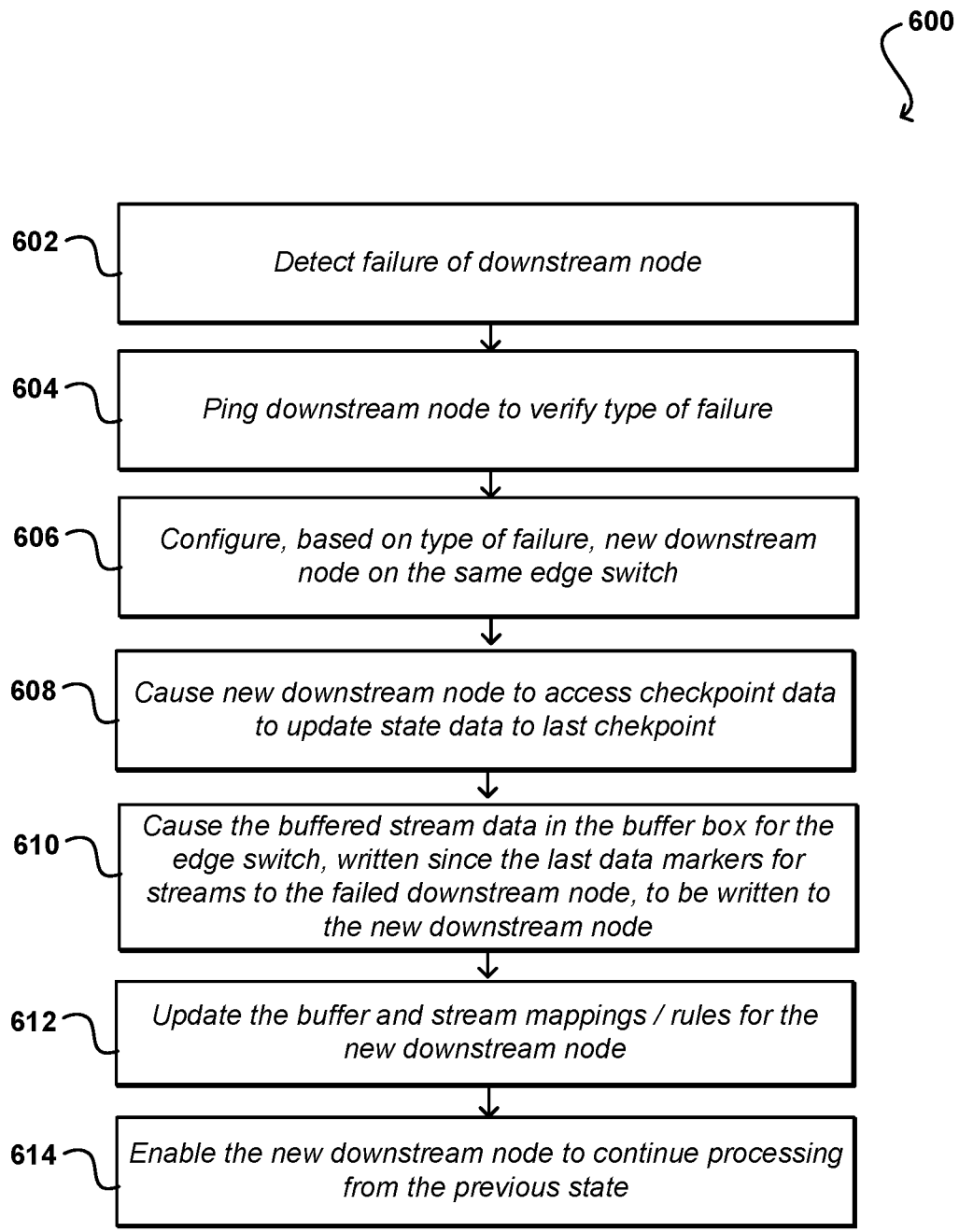
FIG. 6 illustrates an example process for recovering from failure of a downstream processing node that can be utilized in accordance with various embodiments.

FIG. 6 illustrates an example process 600 for recovering from the failure of a downstream node performing stateful stream processing such as discussed with respect to the process 500 of FIG. 5. In this example, the failure of a downstream node is detected 602. As mentioned, the failure can be detected in a number of different ways, such as a failure to receive a heartbeat or other communication from the downstream node, or failure to detect an entry or timestamp in a designated file, among other such options. In this example, the downstream node can be pinged 604 or otherwise contacted to determine a type of failure, such as whether the failure to receive a communication was due to a hardware failure of the node or a software failure of the communication application, etc. Based at least in part upon the type of failure, a new downstream node can be configured 606 that is connected to the same downstream switch, although other node selections can be made as well as discussed and suggested herein. If the node failure was a hardware failure then a new host machine can be selected and configured as the new downstream node, such as where the host machine has sufficient capacity to host the downstream node instance. If the failure was a software failure, then an attempt might be made to restart or reconfigure the existing node to accurately function as the new downstream node.

Once a new downstream node is selected, configured, and/or verified, new downstream node can be caused 608 to obtain the relevant checkpoint data, from the checkpoint repository or other location, to update to the last verified state. The buffered stream data that is stored for the failed node in the buffer box can then be caused 610 to be written to the new downstream node. This can be a result of, for example, the new downstream node informing a high availability module of the updated state, whereby the module can ask the SDN controller to program the edge switch to forward the packets from the buffer box to the new downstream node. Upon transferring the data, the new downstream node should have the same state as the failed node before the failure. As mentioned, this would include any data written on a stream since a last data maker for the downstream node on the stream, or the last point for which the previously sent data was checkpointed. In addition, the relevant buffer and stream mappings and/or rules can be updated 612 (or new mappings and rules generated), via the SDN controller or otherwise, to point to the new downstream node instead of the failed downstream node, although if the new node uses the same address and port then no new mappings may be needed in some embodiments. The new downstream node can then be enabled 612 to resume and continue processing from the prior state of the failed node. As mentioned, since the data is coming from the local buffer then the other nodes across the network can continue processing during the recovery process.

As mentioned, a "switch" as used herein can refer to a network device configured to perform tasks such as packet switching, and the term is used generically to refer to network devices performing operations at all hardware-accelerated "layers" of, for example, the OSI model. The present description primarily focuses on relevance to TCP/UDP (Layer 4+) over IP (Layer 3) over Ethernet (Layer 2), but generally applies to other protocols and technologies, such as Infiniband. "Switch" may be used generically to refer to any device commonly called a "router" (Layer 3+), "multi-layer switch" (Layer 2+), or "top-of-rack (TOR) switch" (typically Layer 2 only). A "router" as used herein refers generally to a network switch performing routing (Layer 3+). The term "router" is often associated with devices performing "core routing" for a data center in a hierarchical pair networking model, so tends to connote a big/expensive device (e.g., a Cisco Catalyst 6500-series switch) with large buffers relative to aggregate line rate. So called "deep buffers" help to deal with the higher likelihood in a highly oversubscribed network of packet buffering caused by uncorrelated flows resulting in dropped packets (i.e. overflowing the buffers)—per statistical multiplexing theory as known in the art.

Figure 7:
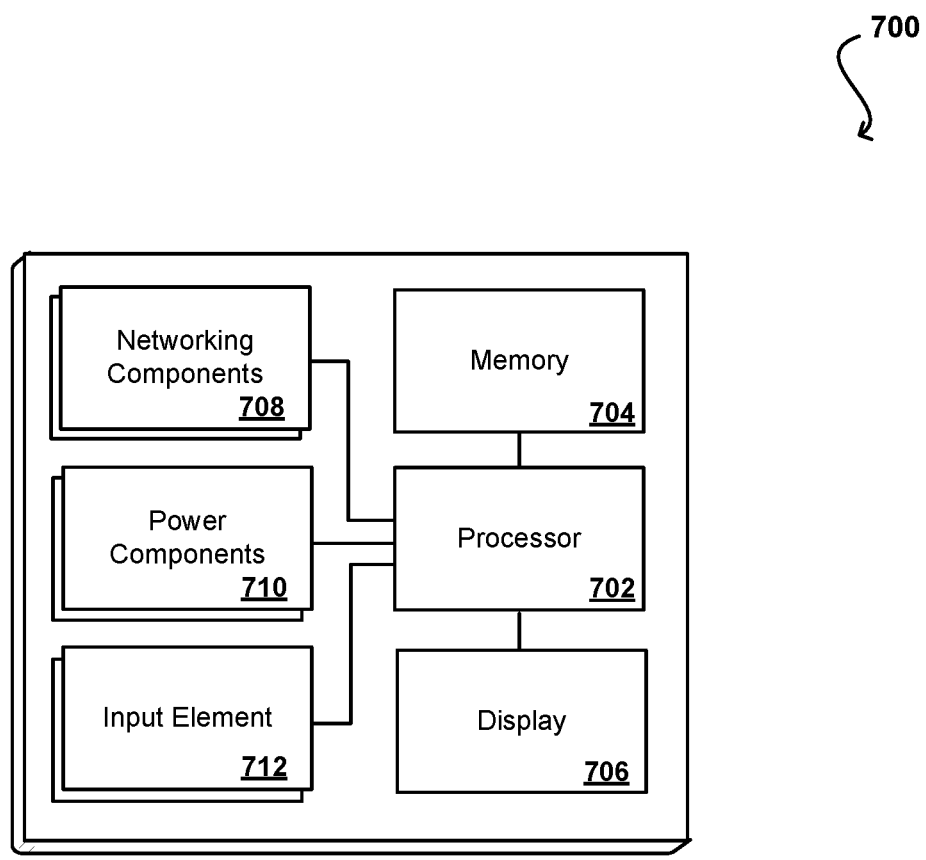
FIG. 7 illustrates components of an example computing device that can be used to implement aspects of various embodiments.

FIG. 7 illustrates a set of basic components of an electronic computing device 700 that can be used to implement aspects of the various embodiments. In this example, the device includes at least one processing unit 702 for executing instructions that can be stored in a memory device or element 704. As would be apparent to one of ordinary skill in the art, the device can include many types of memory, data storage, or computer-readable media, such as a first data storage for program instructions for execution by the processing unit(s) 702, the same or separate storage can be used for images or data, a removable memory can be available for sharing information with other devices, and any number of communication approaches can be available for sharing with other devices. The device may include some type of display 706, such as a touch screen, electronic ink (e-ink), organic light emitting diode (OLED) or liquid crystal display (LCD), although devices such as portable media players might convey information via other means, such as through audio speakers.

The example device also includes one or more networking components 708 operable to communicate, through wired and/or wireless protocols and components, with one or more electronic components across one or more networks. The networks can include any appropriate network, such as the Internet, a cellular network, an Ethernet, a local area network, and the like. It should be understood that the device can have one or more conventional wired and/or wireless communications connections as known in the art. The device also includes a power system 710, such as may include a battery operable to be recharged through conventional plug-in approaches, or through other approaches such as capacitive charging through proximity with a power mat or other such device. Various other elements and/or combinations are possible as well within the scope of various embodiments. In some embodiments the device can include at least one additional input device 712 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of managing data in a networked environment, comprising:
    generating a set of data streams between a set of upstream nodes and a set of downstream nodes in a stateful stream processing network, the respective upstream nodes capable of sending data using the data streams for processing by one or more of the downstream nodes;
    setting one or more routing rules causing data from a respective upstream node to be copied to a buffer box for an edge switch directly connected to a respective downstream node, the buffer box comprising memory for temporarily storing the data received for the respective downstream node;
    causing the upstream nodes to place data markers at determined locations in the data streams;
    causing the downstream nodes to store, in response to receiving a data marker in a data stream, data received from an upstream node prior to receipt of the data marker in the data stream, wherein the downstream nodes store the data to a checkpoint data repository;
    detecting a failed downstream node of the set of downstream nodes, the failed downstream node being associated with a data stream;
    configuring a new downstream node to assume functionality of the failed downstream node;
    causing the new downstream node to obtain data stored in the checkpoint data repository; and
    causing the buffer box to forward to the new downstream node data copied to the buffer box since the last data marker for the failed downstream node, wherein the new downstream node continues processing the data stream based on the data obtained from the checkpoint data repository and data copied to the buffer box.

2. The computer-implemented method of claim 1, further comprising:

determining that data from a respective upstream node, transmitted prior to a most recent data marker, is written to the checkpoint data repository; and causing a copy of the data, stored to the buffer box, to be deleted from the buffer box, wherein the buffer box stores data transmitted since a most recent data marker from a respective upstream node.

3. The computer-implemented method of claim 1, further comprising:

identifying the failed downstream node using a high availability component of the stateful stream processing network;

identifying that the failed downstream node is hosted on a first server; and determining, by the high availability component, the new downstream node, wherein the new downstream node corresponds to one of:

a second server connected to the respective edge for the failed downstream node; or a new node instance executing on the first server.

4. The computer-implemented method of claim 1, further comprising:

configuring, using a Software Defined Network (SDN) controller, a set of rules to cause data transmitted by the upstream nodes to be stored to the respective buffer boxes.

5. The computer-implemented method of claim 1, further comprising:

causing the buffer box to maintain a mapping between stored data and respective downstream nodes for the stored data.

6. A computer-implemented method, comprising:

causing a first upstream node to transmit data and at least one checkpoint marker to a data buffer connected to an edge switch;

storing data stored in the data buffer in a checkpoint data repository, wherein the at least one checkpoint marker triggers writing of data to the checkpoint data repository;

detecting a failure of a first downstream node of a stream processing system, the first downstream node connected to an edge switch of the stream processing system;

allocating a second downstream node to perform tasks previously allocated to the first downstream node;

causing the second downstream node to obtain recent data comprising at least a portion of the data from the data buffer connected to the edge switch, wherein the recent data is sent to the first downstream node before the failure of the first downstream node, and wherein the recent data is sent after a most recent checkpoint marker transmitted by the first upstream node; and causing the second downstream node to perform the tasks using a state of the first downstream node at the time of the failure, wherein the state of the first downstream node includes the data written to the checkpoint data repository and the recent data.

7. The computer-implemented method of claim 6, further comprising:

configuring a rule to cause the first downstream node, to receive data from a server, functioning as an upstream node, using a stateful data stream.

8. The computer-implemented method of claim 6, further comprising:

configuring a copy of the data on the stateful data stream to the first downstream node to be transmitted to the data buffer for the edge switch.

9. The computer-implemented method of claim 6, further comprising:

allocating the data buffer, the data buffer comprising a memory of the edge switch or a data storage component connected to the edge switch.

10. The computer-implemented method of claim 6, wherein the edge switch is a top of rack switch for a server rack, and wherein the first downstream node is located in the server rack and directly connected to the top of rack switch.

11. The computer-implemented method of claim 6, further comprising:

determining, using a high availability component, the failure of the first downstream node and an identity of the second downstream node, the second downstream node being a separate physical server from the first downstream node or a separate virtual component on a same physical server.

12. The computer-implemented method of claim 6, further comprising:

causing each of a set of servers, functioning as upstream nodes, to place data markers in respective stateful data streams, the data markers indicating to a receiving server to write previously transmitted data on the stateful data streams to a checkpoint data repository.

13. The computer-implemented method of claim 12, further comprising:

causing the second downstream node to obtain a respective subset of the previously transmitted data, corresponding to the first downstream node, from the checkpoint data repository before causing the second server to obtain the recent data from the data buffer for the edge switch.

14. The computer-implemented method of claim 13, further comprising:

causing the data buffer to delete data for the second downstream node after a data maker is received in a respective data stream to the second downstream node and previously transmitted data on the stream is written to the checkpoint data repository.

15. A system, comprising:

at least one processor; and memory including instructions that, when executed by the at least one processor, cause the system to:

cause a first upstream node to transmit data and at least one checkpoint marker to a data buffer connected to an edge switch;

store data stored in the data buffer in a checkpoint data repository, wherein the at least one checkpoint marker triggers data sent prior to the most recent checkpoint marker to be removed from the data buffer and wherein the least one checkpoint marker triggers writing of data to a persistent data store;

detect a failure of a first downstream node of a stream processing system, the first downstream node connected to an edge switch of the stream processing system;

configure a second downstream node to perform tasks previously allocated to the first downstream node;

cause the second downstream node to obtain recent data comprising at least a portion of the data from the data buffer connected to the edge switch, the recent data being sent to the first downstream node before the failure of the first downstream node and after a most recent checkpoint marker transmitted by the first upstream node; and cause the second downstream node to obtain a state of the first downstream node at the time of the failure for performing the tasks, wherein the state of the first downstream node includes the data written to the checkpoint data repository and the recent data.

16. The system of claim 15, wherein the instructions when executed further cause the system to:
configure a rule to cause the first downstream node to function as a downstream node capable of receiving data from a server, functioning as an upstream node, using a stateful data stream.

17. The system of claim 16, wherein the instructions when executed further cause the system to:
configure a copy of the data on the stateful data stream from the first downstream node to be transmitted to the data buffer for the edge switch.

18. The system of claim 15, wherein the instructions when executed further cause the system to:
select the data buffer, the data buffer comprising a memory of the edge switch or a data storage component connected to the edge switch.

19. The system of claim 15, wherein the instructions when executed further cause the system to:
determine, using a high availability component, the failure of the first downstream node and an identity of the second downstream node, the second server being a separate physical server from the first downstream node or a separate virtual component on a same physical server.

20. The system of claim 15, wherein the instructions when executed further cause the system to:
cause each of a set of servers, functioning as upstream nodes, to place data markers in respective stateful data streams, the data markers indicating to a receiving server to write previously transmitted data on the stateful data streams to a checkpoint data repository; and
cause the second downstream node to obtain a respective subset of the previously transmitted data, corresponding to the first downstream node, from the checkpoint data repository before causing the second downstream node to obtain the recent data from the data buffer for the edge switch.

* * * * *